United States Patent
Caffrey

(10) Patent No.: US 8,595,556 B2
(45) Date of Patent: *Nov. 26, 2013

(54) SOFT FAILURE DETECTION

(75) Inventor: James M. Caffrey, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/904,457

(22) Filed: Oct. 14, 2010

(65) Prior Publication Data

US 2012/0096320 A1  Apr. 19, 2012

(51) Int. Cl.
*G06F 11/00* (2006.01)

(52) U.S. Cl.
USPC ............................. 714/33; 714/47.2; 714/37

(58) Field of Classification Search
None
See application file for complete search history.

(56) References Cited

U.S. PATENT DOCUMENTS

| | | | |
|---|---|---|---|
| 6,571,270 B1 | 5/2003 | Lai et al. | |
| 6,665,758 B1 | 12/2003 | Frazier et al. | |
| 7,379,846 B1 * | 5/2008 | Williams et al. | 702/185 |
| 7,412,448 B2 | 8/2008 | Agarwal et al. | |
| 7,519,860 B2 | 4/2009 | Hatonen et al. | |
| 7,533,070 B2 | 5/2009 | Guralnik et al. | |
| 8,271,838 B2 * | 9/2012 | Avritzer et al. | 714/48 |
| 2003/0061265 A1 * | 3/2003 | Maso et al. | 709/105 |
| 2005/0022063 A1 | 1/2005 | Grebenev | |
| 2005/0188079 A1 | 8/2005 | Motsinger et al. | |
| 2006/0080626 A1 * | 4/2006 | Ohba et al. | 716/6 |
| 2008/0148180 A1 * | 6/2008 | Liu et al. | 715/800 |
| 2009/0019318 A1 | 1/2009 | Cochrane | |
| 2009/0300644 A1 | 12/2009 | Lee et al. | |
| 2010/0058121 A1 * | 3/2010 | Bouchard et al. | 714/57 |
| 2010/0083029 A1 | 4/2010 | Erickson et al. | |
| 2011/0185234 A1 * | 7/2011 | Cohen et al. | 714/37 |
| 2011/0231707 A1 * | 9/2011 | Davenport et al. | 714/37 |

OTHER PUBLICATIONS

Non-Final Office Action dated Mar. 7, 2013 received for U.S. Appl. No. 13/666,170.

* cited by examiner

*Primary Examiner* — Christopher McCarthy
(74) *Attorney, Agent, or Firm* — Fleit Gibbons Gutman Bongini & Bianco PL; Thomas Grzesik

(57) ABSTRACT

A method, system, and computer program product detect soft failures as follows. A set of artifacts being generated by at least one process in a system is monitored. A number of artifacts being generated by the process is determined to be below a given threshold in response to the monitoring. The process is monitored in response to the determination. A current state of the process is determined in response to the analyzing. A notification is generated in response to the current state of the process including a set of abnormal behaviors.

15 Claims, 10 Drawing Sheets

Last successful model time : 01/27/2009 17:08:01
Next model time : 01/27/2009 23:08:01
Model interval : 360
Last successful collection time: 01/27/2009 17:41:38
Next collection time : 01/27/2009 17:56:38
Collection interval : 15
Persistent address spaces with low rates:

| Job Name | ASID | Message Arrival Rate | Predicted Message Arrival Rate | | |
|---|---|---|---|---|---|
| | | | 1 Hour | 24 Hour | 7 Day |
| JOBS1 | 001D | 0.20 | 23.88 | 22.82 | 15.82 |
| JOBS3 | 0029 | 0.01 | 12.43 | 2.36 | 8.36 |

FIG. 4

| Last successful model time: | The date and time of the last successful model for this check. The predictions on this report were generated at that time. |
|---|---|
| Next model time: | The date and time of the next model. The next model will recalculate the predictions. |
| Model interval: | This parameter determines how often (in minutes) the system is analyzed to construct a new message arrival rate model or prediction. If the detection module determines new prediction calculations are necessary, modeling can occur earlier. |
| Last successful collection time: | The date and time of the last successful data collection for this check. |
| Next collection time: | The date and time of the next collection. |
| Collection interval: | This parameter determines how often (in minutes) to run the data collector that retrieves the current message arrival rate. |
| Message arrival rate in last collection interval: | The actual message arrival rate in the last collection interval where the rate is defined to be the number of messages divided by the CPU seconds. |
| Predicted rates based on...: | The message arrival rates based on one hour, 24 hours, and seven days. If no prediction is available for a given time range, the line is not printed. |
| Job Name: | The name of the job that has message arrivals in the last collection interval. |
| ASID: | The ASID for the job that has message arrivals in the last collection interval. |
| Message Arrival Rate: | The current message arrival rate for the persistent job. The "Message Arrival Count" field is unique to the non-persistent jobs exception report. |
| Message Arrival Counts: | The message arrival count for the non-persistent job. |
| Predicted Message Arrival Rate: | The predicted message arrival rate based on one hour, 24 hours, and seven days of data. UNKNOWN might print for the predicted rate at any point from the time an IPL occurred until at least seven days after the IPL depending on how the data collected prior to the IPL is used. When UNKNOWN is printed, no comparisons are made for that category. |

TABLE 1

FIG. 5

Run Time Diagnostics detected a problem in job: JOBS1

602 — EVENT 06: HIGH - HIGHCPU - SYSTEM: SY1 2009/06/12 - 13:28:46
606 — ASID CPU RATE: 96% ASID: 0027 JOBNAME: DAVIDZ
STEPNAME: DAVIDZ PROCSTEP: DAVIDZ JOBID: STC00042 USERID: ++++++++
JOBSTART: 2009/06/12 - 13:28:35
610 — ERROR: ADDRESS SPACE USING EXCESSIVE CPU TIME. IT MAY BE LOOPING.
614 — ACTION: USE YOUR SOFTWARE MONITORS TO INVESTIGATE THE ASID.

604 — EVENT 07: HIGH - LOOP - SYSTEM: SY1 2009/06/12 - 13:28:46
608 — ASID: 0027 JOBNAME: DAVIDZ TCB: 004E6850
STEPNAME: DAVIDZ PROCSTEP: DAVIDZ JOBID: STC00042 USERID: ++++++++
JOBSTART: 2009/06/12 - 13:28:35
612 — ERROR: ADDRESS SPACE APPEARS TO BE IN A LOOP.
616 — ACTION: USE YOUR SOFTWARE MONITORS TO INVESTIGATE THE ASID.

SOFT FAILURE DETECTION

BACKGROUND

The present invention generally relates to computers, and more particularly relates to detecting soft failures within a computing system.

The next critical resiliency challenge is soft failures where the complex system (cloud, containers within a hybrid, an operating system, middleware, or customer application) continues to work but does not provide the needed service. When this type of problem occurs it has a major impact on the customer's IT solution. The component experiencing the failure is unable to detect that the failure is occurring because most of these problems are caused by legal, but abnormal behavior. Conventional soft failure systems can detect certain abnormal behaviors in real time usually before the operations team has observed or been notified about the problem. However, these conventional systems generally depend on the process being monitored emitting too many artifacts (e.g., message identifiers, LOGREC records or records that include information about an abnormal occurrence within a given computing system, using too many processor resources, etc.). Therefore, in many situations these conventional systems can mistakenly classify a process as "normal" based on a "too many" threshold.

BRIEF SUMMARY

In one embodiment, a method for detecting soft failures is disclosed. The method comprises monitoring a set of artifacts being generated by at least one process in a system. A number of artifacts being generated by the process is determined to be below a given threshold in response to the monitoring. The process is monitored in response to the determination. A current state of the process is determined in response to the analyzing. A notification is generated in response to the current state of the process comprising a set of abnormal behaviors.

In another embodiment, an information processing system for detecting soft failures is disclosed. The information processing system comprises a memory and a processor that is communicatively coupled to the memory. A soft failure detection system is communicatively coupled to the memory and the processor. The soft failure detection system is for performing a method. The method comprises monitoring a set of artifacts being generated by at least one process in a system. A number of artifacts being generated by the process is determined to be below a given threshold in response to the monitoring. The process is monitored in response to the determination. A current state of the process is determined in response to the analyzing. A notification is generated in response to the current state of the process comprising a set of abnormal behaviors.

In yet another embodiment, a computer program product for detecting soft failures is disclosed. The computer program product comprises a storage medium readable by a processing circuit and storing instructions for execution by the processing circuit for performing a method. The method comprises monitoring a set of artifacts being generated by at least one process in a system. A number of artifacts being generated by the process is determined to be below a given threshold in response to the monitoring. The process is monitored in response to the determination. A current state of the process is determined in response to the analyzing. A notification is generated in response to the current state of the process comprising a set of abnormal behaviors.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 4 shows one example of a report that is generated in response to determining that an artifact metric count of a process is below a given threshold according to one embodiment of the present invention;

FIG. 5 is a table that comprises a description of the parameters in the report of FIG. 4 according to one embodiment of the present invention;

FIG. 6 shows one example of an output resulting from a process interrogation operation according to one embodiment of the present invention;

DETAILED DESCRIPTION

Operating Environment

Figure 1:
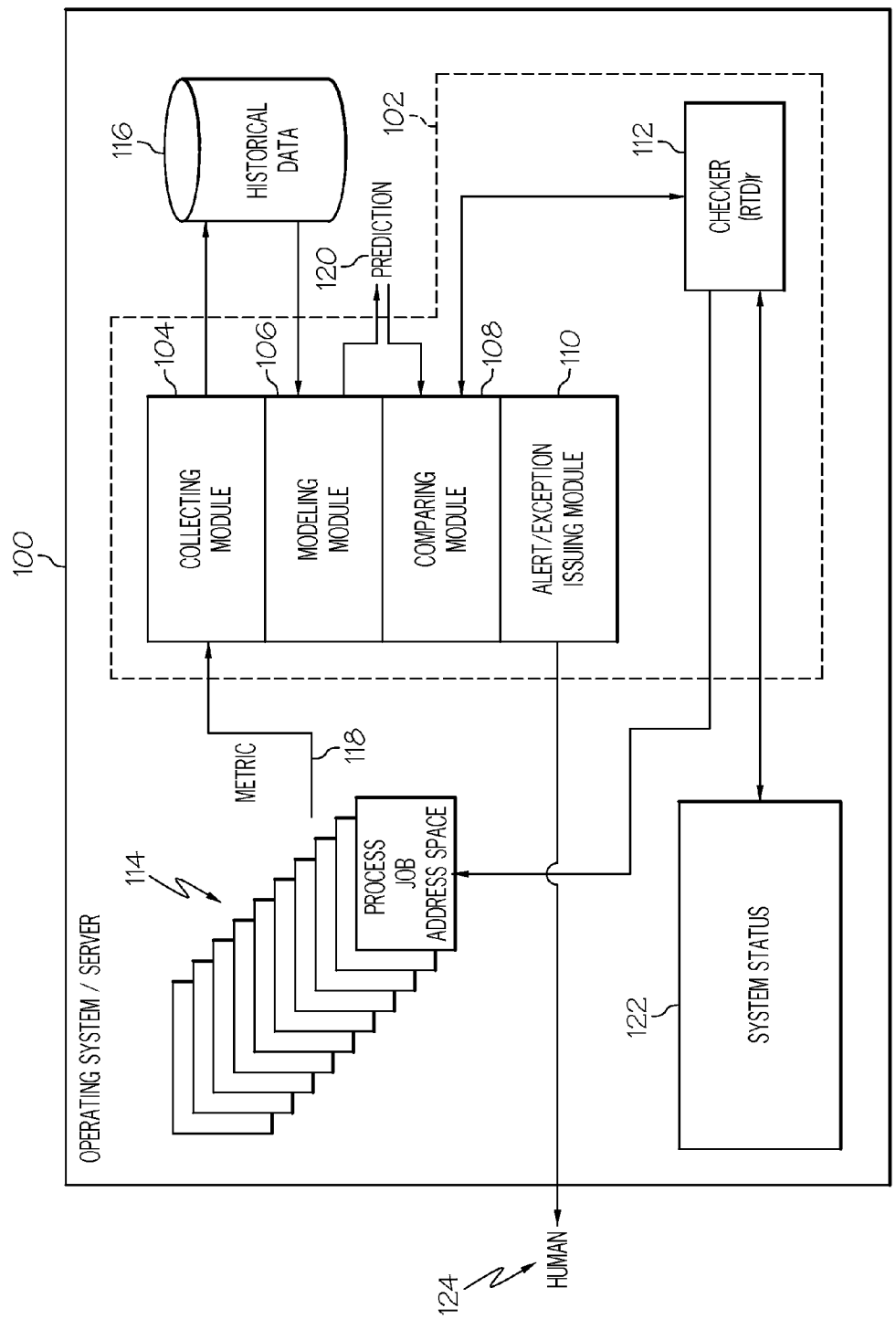
FIG. 1 is a block diagram illustrating one example of an operating environment according to one embodiment of the present invention.

FIG. 1 shows one example of an information processing system 100 comprising a soft failure detection system 102. There are three general categories of software detected system failures: masked failure, hard failure, and failure caused by abnormal behavior. A masked failure is a software detected system failure which is detected by the software and corrected by the software. A hard failure is when the software fails completely, quickly and cleanly. For example, a hard failure occurs when an operating system kills a process. A system failure caused by abnormal behavior is defined as unexpected, unusual, or abnormal behavior which causes the software solution to not provide the service requested.

This abnormal behavior of the software combined with events that usually do not generate failures produce secondary effects that may eventually result in a system failure. These types of failures are known as soft failures and are detected by the soft failure detection system 102. Soft failures can slowly lead to the degradation of the operating system. These soft failures are a small percentage of the problems when compared to masked failures and hard failures, but they cause most of the business impact. Soft failures are hard to diagnose due to the fact that the failure likely does not occur in the address space causing the problem, but more likely occurs in another address space. This sympathy sickness has been observed when either hard failures or abnormal behavior generates a system failure that could not be isolated to a failing component or subcomponent. Failures caused by abnormal behavior often generate sympathy sickness where the problem escalates from a minor problem to the point that the service eventually stops working. Because they are difficult to detect, are very unique, can be triggered anywhere in either software or hardware, and occur infrequently, failure isolation is very difficult. Hard failures are deterministic in nature. However, a failure caused by soft failures is difficult to recognize within the component and are probabilistic and depend on secondary effects to cause observable damage.

The soft failure detection system 102 is able to predict if a soft failure will occur sometime in the future and identify the cause while keeping the base operating system components stateless. As will be discussed in more detail below, in addition to detecting soft failures based on a number of artifacts being above a given threshold, the soft failure detection system 102 is also able to detect these types of failures when the number of artifacts being generated is below a given threshold as well. This allows the soft failure detection system 102 to detect more problems without increasing the number of false positives being generated or the amount of resources being consumed to detect the abnormal behavior. Another advantage is that the skill level needed to resolve the problem when abnormal behavior is detected is reduced. Also, existing operating systems, middleware, or applications are not required to be modified to implement one or more embodiments of the present invention.

FIG. 1 shows that the soft failure detection system 102 comprises a collecting module 104, a modeling module 106, a comparison module 108, an alert/exception issuing module 110 (which generates alerts/exceptions displayed to a user 124), and a check module 112. Each of these components is discussed in greater detail below. The system 100 further comprises a set process job address spaces 114 that generate the artifacts monitored by the soft failure detection system 102 for detecting and identifying soft failures associated therewith. These artifacts can include, but are not limited to, messages to operator, accounting records, global serialization requests, trace records, output to data sets, logs of errors detected, and/or the like. Historical data 116 corresponding to metrics (e.g., measured values) 118 associated with the artifacts associated with the processes being monitored is maintained.

As will be discussed in greater detail below, this historical data 116 is used by the soft failure detection system 102 to identify "chatty" units of work. Once a "chatty" unit of work is identified the soft failure detection system 102 can use the historical data 116 to generate a prediction 120 (e.g., expected value, threshold, etc.) for the metric for a given interval of time. The soft failure detection system 102 uses this prediction 120 and the check module 112, which can comprise existing operating system capabilities, to interrogate the operating system to obtain system status information 122 for the "chatty" unit of work to detect and identify soft failures. These aspects of the soft failure detection system 102 are discussed in greater detail below.

Soft Failure Detection

Figure 2:
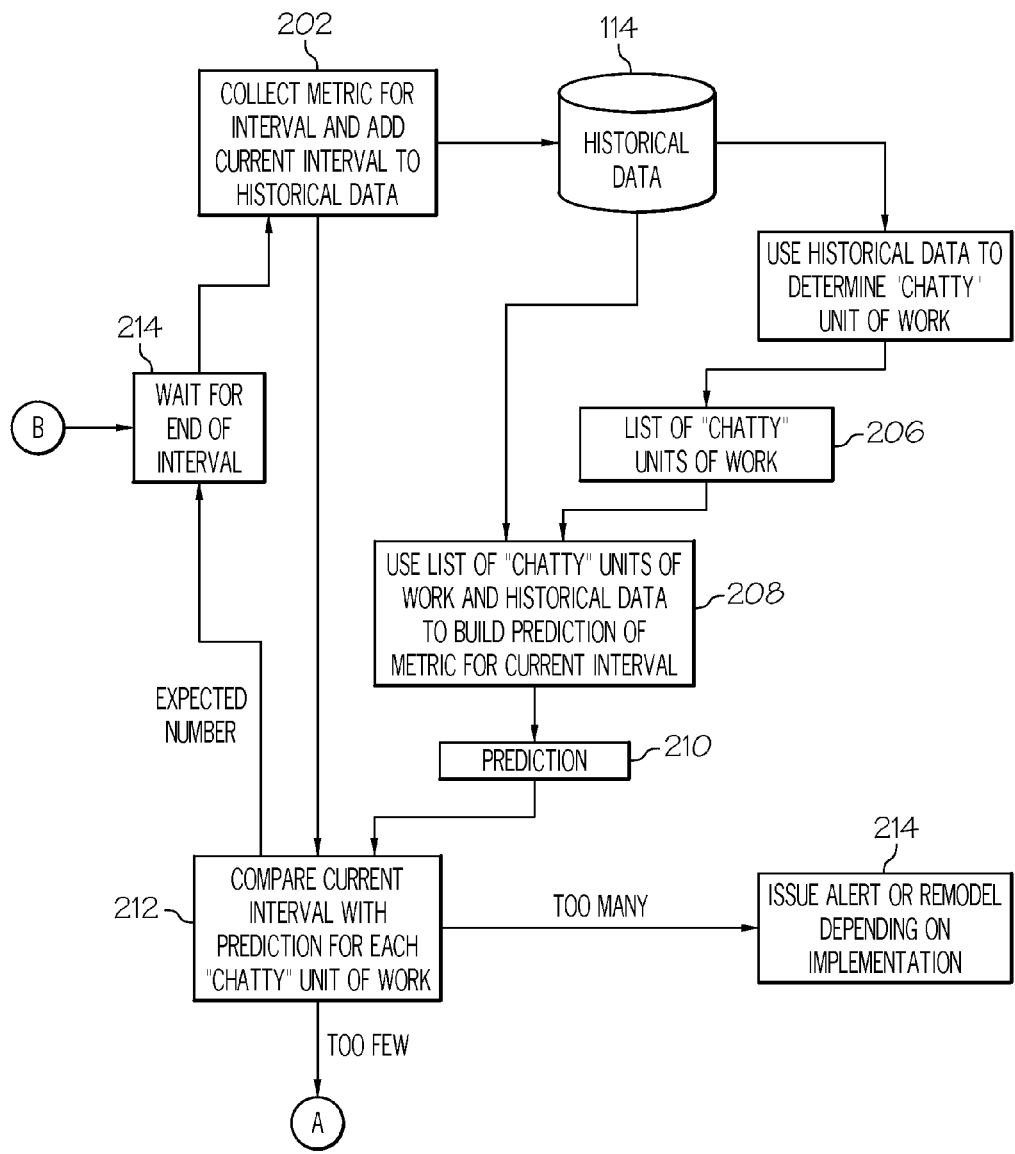
FIGS. 2-3 are functional flow diagrams illustrating one example of detecting soft failures in a computing system according to one embodiment of the present invention.
Figure 3:
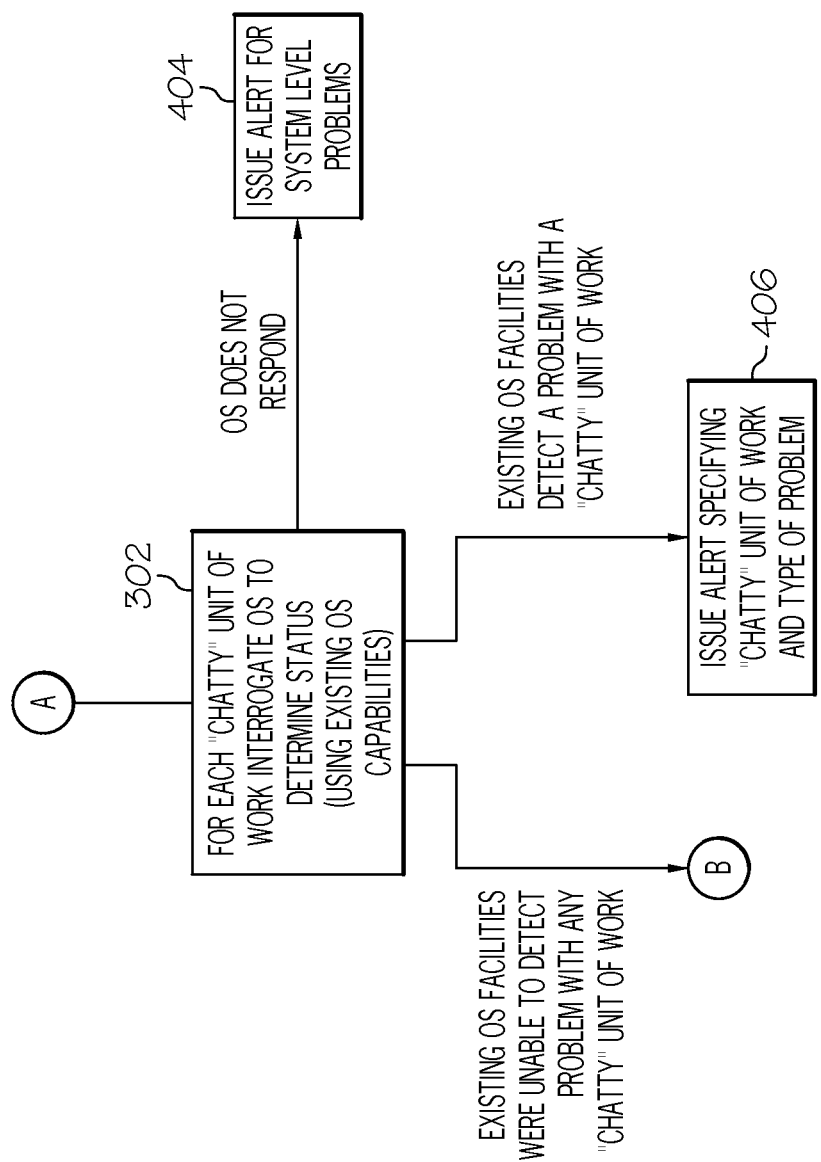

FIGS. 2-3 illustrate functional flow diagrams illustrating various examples of detecting soft failures in a system. As will be shown in greater detail below, the soft failure detection system 102 uses historical data along with machine learning and mathematical modeling to detect abnormal behavior and the potential causes of this abnormal behavior.

The collecting module 104 of the soft failure detection system 102, at step 202, collects a set of metrics associated with artifacts for a given interval of time and adds the collected data to the historical data 114. For example, the collecting module 104 monitors the series of artifacts routinely generated by the set of address spaces 112 using standard operating system or firmware interfaces. As discussed above, these artifacts can include messages to operator, accounting records, global serialization requests, trace records, output to data sets, logs of errors detected, and/or the like. The monitored collected metrics, such as a detected number of a given artifact, are stored as historical data 114 to monitor the state of the set of address spaces 112 since a soft failure can impact some or all of the monitored artifacts.

The soft failure detection system 102, at step 204, then uses the historical data 114 that was collected to identify a "chatty" unit of work. In other words, the soft failure detection system 102, for each artifact, determines which of the set of address spaces 112 will generate sufficient traffic with respect to that given artifact to allow the detection of abnormal behavior. The soft failure detection system 102, at step 206, then creates a list of "chatty" units of work.

The modeling module 106 of the soft failure detection system 102, at step 208, uses the list of "chatty" units of work and historical data 114 to build a prediction of an artifact metric for a given interval of time. The modeling module 106 then, at step 210, outputs a prediction 120 (e.g., expected value, threshold, etc). For example, the modeling module 106 uses "machine learning" processes to learn the normal behavior of a given artifact(s) generated by a "chatty" unit of work. Stated differently, the modeling module 106 takes the data 114 that was collected and predicts the value that it expects to see at the end of the model interval or at this point in time. For example, the modeling module 106 can predict that a message arrival rate metric for console messages is 23.88 messages in 1 hour, 22.82 messages in 24 hours, and 15.82 messages in 7 days.

The comparing module 108 of the soft failure detection system 102, at step 212, then compares the data being collected at the current interval of time with the prediction 120 for each "chatty" unit of work. If the comparison module 108 determines that the current metric count substantially meets (e.g., equal to or within a given delta) the predicted value, the soft failure detection system 102, at step 214, waits for the end of the current interval and then the flow returns to step 202. If the comparison module 108 determines that the current metric count is greater than the predicted value (or is a given threshold above the predicted value), the exception issuing module 110, at step 216, issues an alert of remodels the "chatty" unit of work. The exception can point to the specific type of artifact, time period, and specific "chatty" unit of work to allow the operations team to focus on a limited area of the system when working to resolve the problem.

However, if the comparison module 108 determines that the metric count is below the predicted value (or is a given threshold below the predicted value) the control flows to entry point A of FIG. 3. In one embodiment, the soft failure detection system 102 can generate a report with information associated with jobs with a metric count that is below the predicted value. For example, FIG. 4 shows a report 400 that is generated by the soft failure detection system 102 in response to the determining that the metric count is below the predicted value. TABLE 1 in FIG. 5 shows a description of each parameter in the report 400. This report 400 is generated when any one or more tracked, persistent jobs cause an exception for an unusually small number of messages. In one embodiment, only the tracked jobs that caused the exception are included in the list of jobs 402 on the report 400. As can be seen from FIG. 4, JOBS1 had a predicted message arrival rate of 23.88 messages in 1 hour, 22.82 messages in 24 hours, and 15.82 messages in 7 days. JOBS3 had a predicted message arrival rate of 12.43 messages in 1 hour, 2.8 messages in 24 hours, and 8.8 messages in 7 days. However, JOBS1 had a message arrival rate of 0.20 and JOBS3 had a message arrival rate of 0.01. Therefore, the soft failure detection system 102 identifies these jobs as being associated with abnormal behavior and further analyzes these jobs.

It should be noted that conventional soft failure detection systems generally flag a process as "normal" if the metric count is below the predicted value. However, in many situations generating metrics/artifacts below the predicted value is indicative of abnormal behavior and should be taken into consideration. As will be shown below, when the "chatty" unit of work stops generating artifacts or generates an abnormally small number of artifacts the soft failure detection system 102 determines the cause using existing operating system features. The failure of the container/operating system to respond to this request indicates a potentially catastrophic problem with the container/operating system. This prompts the soft failure detection system 102 to generate an alert pointing to potentially catastrophic problem. This alert can be in the form of an exception that points to the type of artifact, specific "chatty" unit of work, and specific problem detected to allow the operations team to resolve the problem.

Turning now to FIG. 3, once the soft failure detection system 102 determines that the metric count is below the predicted value (or is a given threshold below the predicted value), the soft failure detection system 102, at step 302, utilizes the check module 112 to interrogate the operating system, for each "chatty" unit of work generating "too few" artifacts, to determine status information 122 of the given "chatty" unit of work. In one embodiment, the check module 112 comprises existing operating system capabilities that are used to perform the interrogation. In an operating system such as IBM z/OS the soft failure detection system 102 can utilize, for example, a Runtime Diagnostic tool that allows the soft failure detection system 102 to analyze the specific "chatty" unit of work. For example, the soft failure detection system 102 can examine the "chatty" unit of work for a loop (e.g., excessive consumption of CPU, loop in execution trace (flight recorder), etc.); for a serialization dead lock state or contention for lock state within the process; to determine if the unit is waiting for events within the process, between processes, among cluster elements, etc.; to examine messages issued by the operating system looking for other failures which can impact the "chatty" unit; and/or the like.

Another operating system example is IBM z/VM running a Linux virtual machine where z/VM is a specific instance of a hypervisor. The check module 112 can take multiple samples to determine if the specific Linux instance ("chatty" unit of work) is hung by examining the "chatty" unit of work for a loop by looking at the a sampling of the PSW-looping; examining the "chatty" unit of work for input-output (IO) contention (output from display SCHIB or indicate IO), referred to as "waiting for IO"; examining the "chatty" unit of work for utilization using CP INDICATE USER and CP INDICATE QUEUES, referred to as "not dispatchable" or "non-dispatchable"; and/or the like.

If the soft failure detection system 102 determines that the operating system is not responding, the alert/exception issuing module 110 of the soft failure detection system 102, at step 404, issue an alert indicating that system level problems have been detected. If the soft failure detection system 102 determines that the check module 112 was not able to detect any problem with the given "chatty" unit of work the control flows to Entry Point B in FIG. 2. However, if the soft failure detection system 102 determines that the check module 112 has detected a problem with the "chatty" unit of work, the alert/exception issuing module 110, at step 406, issues an alert/exception that identifies the specific "chatty" unit of work and the type of problem. This alert/exception can also include the information returned by the check module 116, which points to the specific problem within the address space. Therefore, the soft failure detection system 102 identifies the lists of jobs that were the likely cause of the soft failure and provides a recommendation on how the user can preserve the system.

For example, FIG. 6 shows one example of the output provided by the check module 112 as a result of the interrogation process discussed above. In the example of FIG. 6, the check module 112 has detected a problem with respect to the job JOBS1 identified in the report 400 of FIG. 4. This output 600 lists one or more detected events 602, 604 that is the cause of the problem; identifies the particular job with identification information 606, 608; identifies the particular error 610, 612 associated with the job; and also provides a recommended action 614, 616 to the user.

Figure 7:
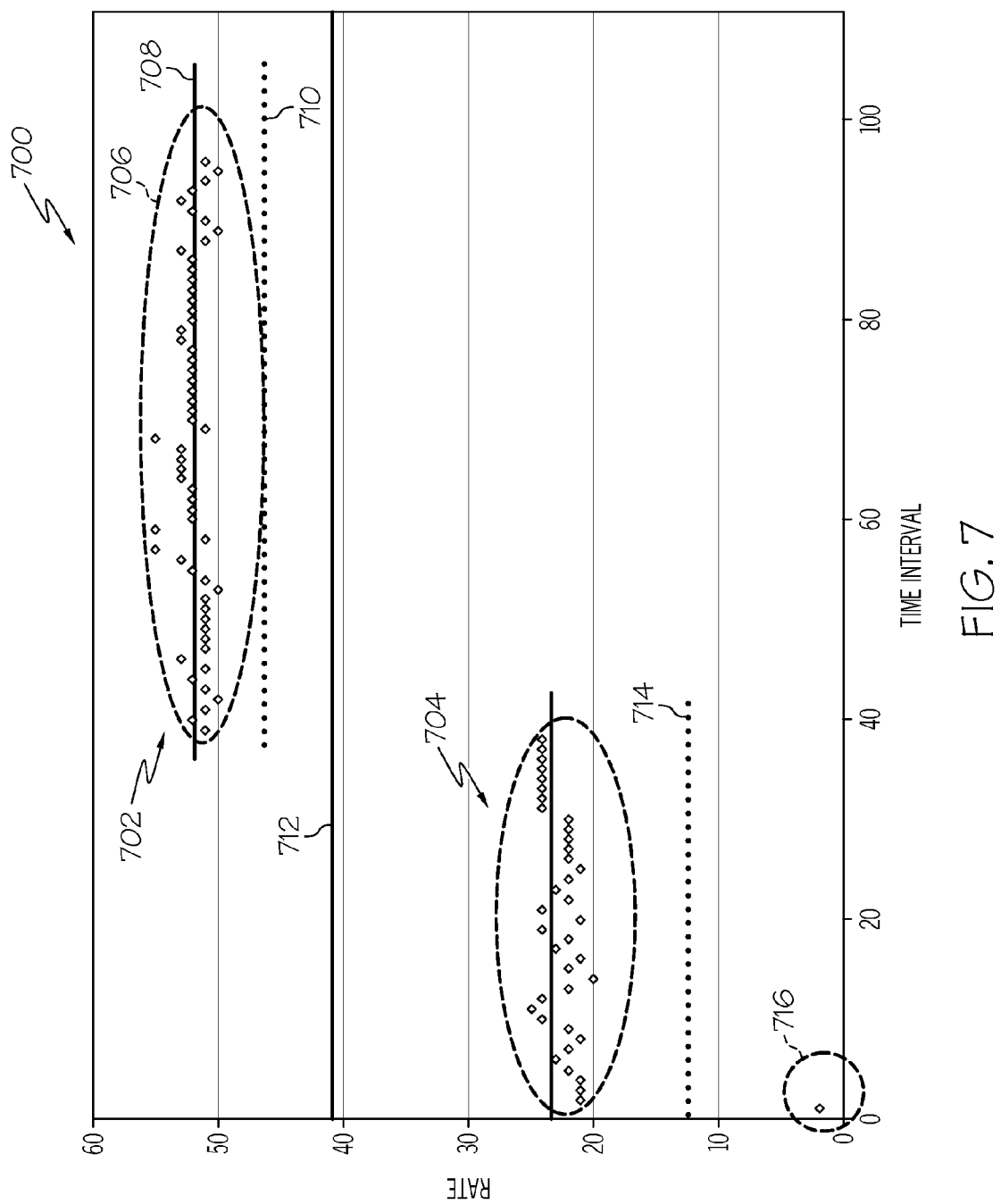
FIG. 7 shows one example of graph used to determine when abnormal behavior is occurring based on too few messages being generated by a tracked persistent address space, another persistent address space, or for the entire operating system image according to one embodiment of the present invention.

FIG. 7 shows one example of how the soft failure detection system 102 can detect when abnormal behavior is occurring based on too few messages being generated by a tracked persistent address space, another persistent address space, or for the entire image. In particular, FIG. 7 shows a graph 700 of message arrival rate. The graph 700 shows the samples, clusters, means, and lower bounds that are evaluated by the soft failure detection system 102 to construct the expected value of the lower bound of the message arrival rate. This lower bound is used to determine if abnormal behavior is potentially occurring. When the expected lower bound is greater than the current interval value, the soft failure detection system 102 utilizes the check module 112 to determine if correctable/detectable abnormal behavior is occurring, as discussed above.

The data being modeled in FIG. 7 is a time series of message arrival rates. Four time series are constructed from the historical data 114 to predict the message arrival rate for the current interval: 1 hour, 24 hours, 7 days, and 30 days. This example predicts the expected value of the message arrival rate using historical data for the last 24 hours. The example of FIG. 7 uses a collection interval of 15 minutes and a lower bound standard deviation of 3 to predict the lower bound. Each diamond in the graph 700 is a data point that reflects the number of messages that arrived during that 15 minutes interval divided by the amount of CPU used during that period. The CPU usage accounts for "enabled wait time" and number of processors in the image.

The soft failure detection system 102 splits the data into two or more parts to minimize the variation within the clusters. In one embodiment, the soft failure detection system 102 selects the right cluster 702 since it comprises the message arrival rate for the interval at this time 24 hours ago. However, there are a set "edge" cases when the soft failure detection system 102 selects the left cluster 704 instead. The choice between the right and left clusters 702, 704 is determined by a set of rules that select the appropriate cluster based on the number of intervals in the left and right clusters 702, 704 and if the behavior of the system has changed. These rules determine which cluster is the better predictor of the expected behavior. Clustering is useful with respect to large standard deviations.

In this example the right cluster (leaf) 702 comprises the value that is to be used to predict the current value based on what happened 24 hours ago. The clusters are the data points within the ovals 706. The solid line 708 passing through the cluster 702 is the mean of the cluster 702 and the dashed line 710 is the lower bound using a standard deviation of 3. The solid line 712 below the cluster 702 is the overall mean and the dashed line 714 toward the bottom of the graph 700 is the lower bound again using a standard deviation of 3. The data point in the oval 716 at the bottom of the graph 700 is the current value collected by the soft failure detection system 102 for the current interval. TABLE 2 below shows the various values associated with the graph 700.

TABLE 2

| Cluster Name | Mean of message arrival rate | Std Dev | Lower Bound |
|---|---|---|---|
| Right Cluster | 51.9 | 1.1 | 48.6 |
| Left Cluster | 22 | 3.6 | 11.2 |
| No Clustering | 40.1 | 14.9 | −4.6 |
| Current interval | 2 | | |

In this example where the right cluster 702 is selected the appropriate lower bound is 48.6. Given that the current interval value of 2 is less than the lower bound, the soft failure detection system 102 utilizes the check module 116 to evaluate the address space or the entire operating system image. If problems were detected by the check module 116 the soft failure detection system 102 issues an alert/exception, as discussed above.

As can be seen, the soft failure detection system 102 is able to utilize functions such as learning chatty unit of work, learning abnormal behavior, and evaluating a process or address space for a specific set of failures to detect a "hung" process or address space. Without one or more embodiments of the present invention abnormal behavior detection systems will generate a very large number of false positives if the confidence interval is set to high. Also, abnormal behavior detection systems will miss soft failures if the confidence interval is set to low. Another advantage of the present invention is that processing resources are no longer wasted by evaluating multiple address spaces and processes which are normal when a human observes the problem which can be too late to take corrective actions. The soft failure detection system 102 eliminates multiple human processing steps that would need to be taken when a soft failure is detected. A further advantage is that the likelihood that the detailed analysis will be completed before the image is unresponsive is increased. Also, the soft failure detection system 102 does not require an agent within the chatty unit of work or detailed knowledge of the structure of the chatty unit of work.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
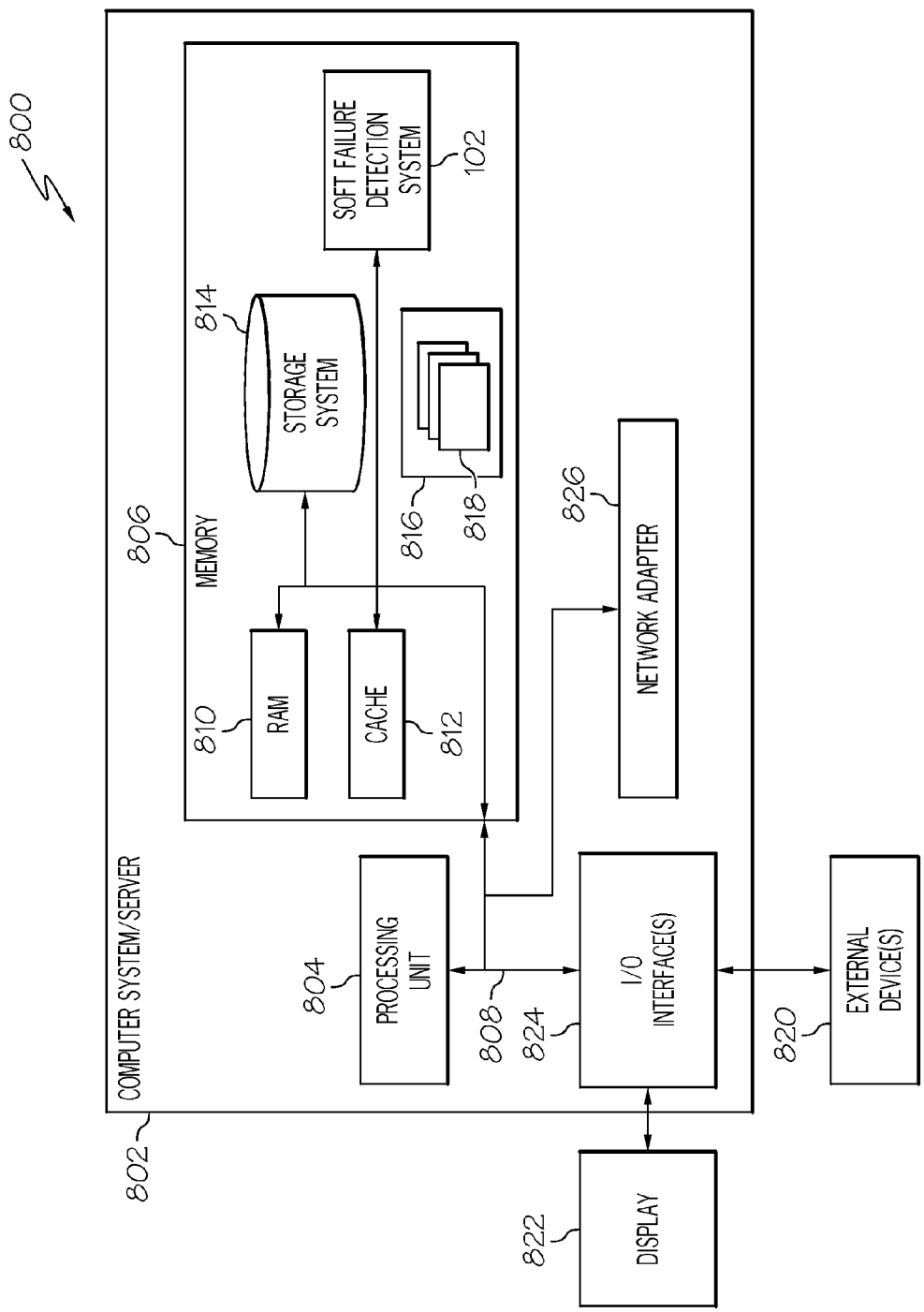
FIG. 8 illustrates one example of a cloud computing node according to one embodiment of the present invention.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, a computer system/server 802 (such as information processing system 100 in FIG. 1) in cloud computing node 800 is shown in the form of a general-purpose computing device. It should be noted that this system 802 is not required to reside within a cloud computing environment and can reside in a non-cloud computing environment as well. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806, in one embodiment, comprises the soft failure detection system 102 and its components as shown in FIG. 1. These one or more components of the soft failure detection system 102 can also be implemented in hardware as well. The system memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the invention as described herein.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
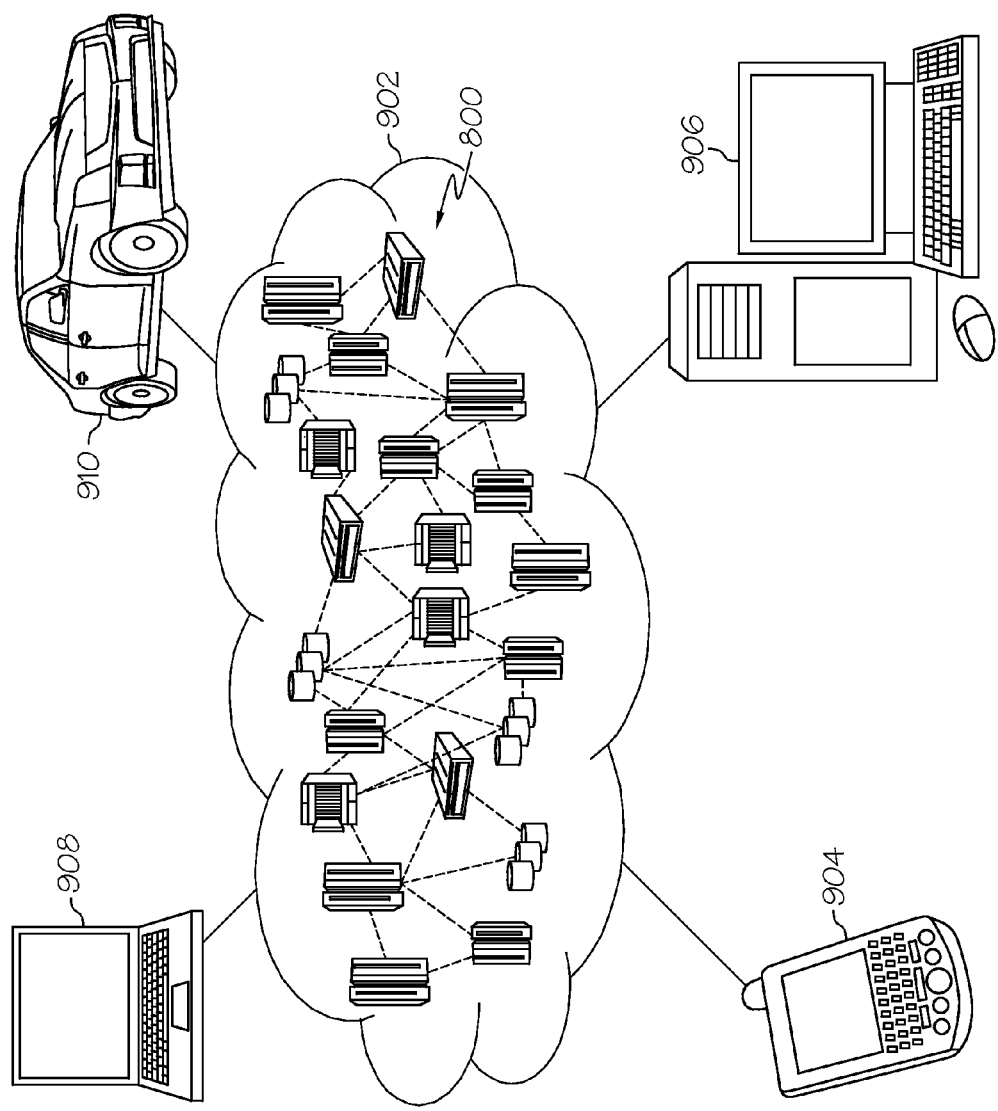
FIG. 9 illustrates one example of a cloud computing environment according to one example of the present invention.

Referring now to FIG. 9, illustrative cloud computing environment 902 is depicted. As shown, cloud computing environment 902 comprises one or more cloud computing nodes 800 with which local computing devices used by cloud consumers, such as, for example, personal digital assistant (PDA) or cellular telephone 904A, desktop computer 906B, laptop computer 908, and/or automobile computer system 910 may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 902 to offer infrastructure, platforms and/or software as services for which a cloud consumer does not need to maintain resources on a local computing device. It is understood that the types of computing devices 904, 906, 908, 910 shown in FIG. 9 are intended to be illustrative only and that computing nodes 800 and cloud computing environment 902 can communicate with any type of computerized device over any type of network and/or network addressable connection (e.g., using a web browser).

Figure 10:
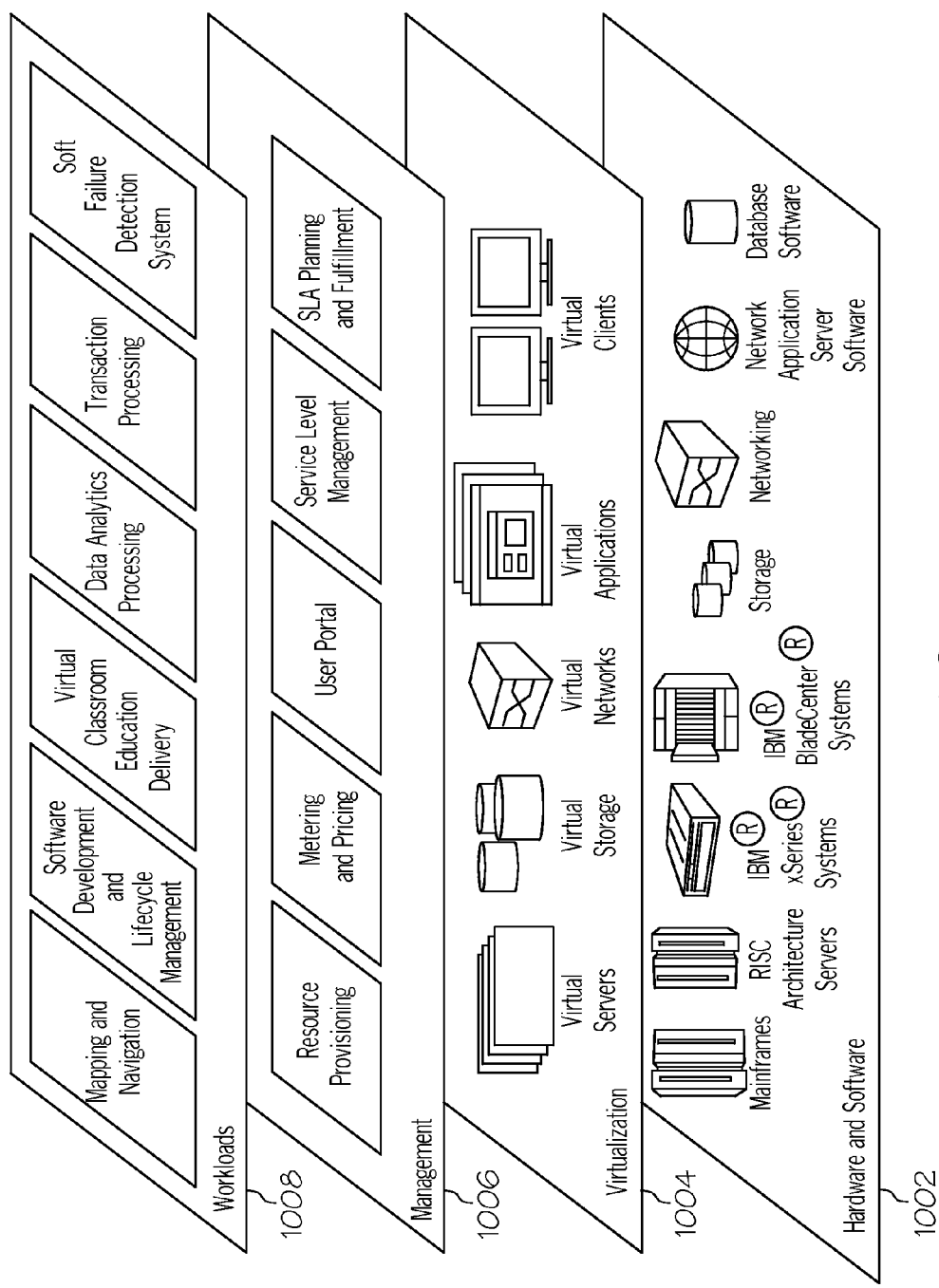
FIG. 10 illustrates abstraction model layers according to one example of the present invention.

Referring now to FIG. 10, a set of functional abstraction layers provided by cloud computing environment 3702 (FIG. 37) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1004 provides an abstraction layer from which the following examples of virtual entities may be provided: virtual servers; virtual storage; virtual networks, including virtual private networks; virtual applications and operating systems; and virtual clients.

In one example, management layer 1006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

NON-LIMITING EXAMPLES

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information processing system for detecting soft failures, the information processing system comprising:
    a memory;
    a processor; and
    a soft failure detection system communicatively coupled to the memory and the processor, the soft failure detection system for performing a method comprising:
        monitoring a set of artifacts being generated by at least one process in a system;
        determining, based on the monitoring, that a number of artifacts being generated by the process is below a given threshold, wherein the threshold is based on a set of historical data associated with artifact generation by the process;
        analyzing, based on the determining, the process;
        determining, based on the analyzing, a current state of the process; and
        generating a notification based on the current state of the process comprising a set of abnormal behaviors.

2. The information processing system of claim 1, the method further comprising:
    analyzing the set of historical data associated with artifact generation by the process; and
    generating the given threshold based on analyzing the set of historical data.

3. The information processing system of claim 1, wherein the set of abnormal behaviors comprises:
    a looping state;
    a serialization deadlock state;
    a lock contention state;
    an event waiting state;
    an input-output contention state; and
    a non-dispatchable state.

4. The information processing system of claim 1, wherein the set of artifacts include at least one of:
    messages to an operator;
    accounting records;
    global serialization requests;
    trace records;
    output to data sets; and
    logs of errors detected.

5. The information processing system of claim 1, wherein the monitoring further comprises:
    monitoring the set of artifacts being generated by the process for a given interval of time.

6. The information processing system of claim 5, wherein the given threshold is further associated with the given interval of time.

7. The information processing system of claim 1, wherein the notification is displayed to a user, identifies the process, and provides a recommendation on how the user can preserve the system.

8. A computer program product for detecting soft failures, the computer program product comprising:
    a non-transitory storage medium readable by a processing circuit and storing instructions for execution by the processing circuit for performing a method comprising:
        monitoring a set of artifacts being generated by at least one process in a system;

determining, based on the monitoring, that a number of artifacts being generated by the process is below a given threshold, wherein the threshold is based on a set of historical data associated with artifact generation by the process;

analyzing, based on the determining, the process;

determining, based on the analyzing, a current state of the process; and generating a notification based on the current state of the process comprising a set of abnormal behaviors.

9. The computer program product of claim 8, the method further comprising: analyzing the set of historical data associated with artifact generation by the process; and generating the given threshold based on analyzing the set of historical data.

10. The computer program product of claim 8, wherein the set of abnormal behaviors comprises:
 a looping state;
 a serialization deadlock state;
 a lock contention state;
 an event waiting state;
 an input-output contention state; and
 a non-dispatchable state.

11. The computer program product of claim 8, wherein the set of artifacts include at least one of:
 messages to an operator;
 accounting records;
 global serialization requests;
 trace records;
 output to data sets; and
 logs of errors detected.

12. The computer program product of claim 8, wherein the monitoring further comprises:
 monitoring the set of artifacts being generated by the process for a given interval of time.

13. The computer program product of claim 12, wherein the given threshold is further associated with the given interval of time.

14. The computer program product of claim 8, wherein the notification is displayed to a user, identifies the process, and provides a recommendation on how the user can preserve the system.

15. A computer program product for detecting soft failures, the computer program product comprising:
 a non-transitory storage medium readable by a processing circuit and storing instructions for execution by the processing circuit for performing a method comprising:
 identifying at least one process in a system to monitor based on a number of artifacts generated by the at least one process;
 monitoring, based on the identifying, a set of artifacts being generated by at the least one process;
 determining, based on the monitoring, that a number of artifacts being generated by the process is below a given threshold, wherein the threshold is based on a set of historical data associated with artifact generation by the process;
 analyzing, in response to the determining, the at least one process;
 determining, based on the analyzing, a current state of the at least one process; and
 generating a notification based on the current state of the at least one process comprising a set of abnormal behaviors.

\* \* \* \* \*